United States Patent
Hiramatsu et al.

(10) Patent No.: US 11,485,365 B2
(45) Date of Patent: Nov. 1, 2022

(54) VEHICLE CONTROL METHOD AND VEHICLE CONTROL DEVICE

(71) Applicant: Nissan Motor Co., Ltd., Yokohama (JP)

(72) Inventors: Machiko Hiramatsu, Kanagawa (JP); Motonobu Aoki, Kanagawa (JP); Takayuki Kondoh, Kanagawa (JP); Tsuyoshi Sakuma, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/599,120

(22) PCT Filed: Mar. 29, 2019

(86) PCT No.: PCT/IB2019/000398
§ 371 (c)(1),
(2) Date: Sep. 28, 2021

(87) PCT Pub. No.: WO2020/201797
PCT Pub. Date: Oct. 8, 2020

(65) Prior Publication Data
US 2022/0144277 A1 May 12, 2022

(51) Int. Cl.
*B60W 30/18* (2012.01)

(52) U.S. Cl.
CPC ... *B60W 30/18163* (2013.01); *B60W 2540/20* (2013.01); *B60W 2552/10* (2020.02);
(Continued)

(58) Field of Classification Search
CPC ....... B60W 30/18163; B60W 2540/20; B60W 2552/10; B60W 2552/53;
(Continued)

(56) References Cited

U.S. PATENT DOCUMENTS

| 5,521,579 A | 5/1996 | Bernhard |
| 2009/0088925 A1* | 4/2009 | Sugawara ............. B60W 30/12 340/436 |

(Continued)

FOREIGN PATENT DOCUMENTS

| CN | 111391843 A | * | 7/2020 |
| JP | 2016-203745 A | | 12/2016 |
| JP | 2017-016182 A | | 1/2017 |

OTHER PUBLICATIONS

English Translation_EspaceNet_CN 111391843 A (Year: 2019).*

*Primary Examiner* — Peter D Nolan
*Assistant Examiner* — Ashley L Redhead, Jr.
(74) *Attorney, Agent, or Firm* — Young Basile Hanlon & MacFarlane, P.C.

(57) ABSTRACT

A vehicle control method for executing a lane change of a subject vehicle includes acquiring surrounding information of the subject vehicle; specifying an entry position indicating a position of an entry destination of the subject vehicle, the entry position being located on a second lane adjacent to a first lane in which the subject vehicle is traveling; when operating a blinker, decelerating the subject vehicle, and executing a lane change; determining that there is a following vehicle which follows the subject vehicle in a predetermined area located behind the subject vehicle on a first lane; setting a preparation time longer than the preparation time when determining that there is not the following vehicle, the preparation time indicating a time from operating the blinker to decelerating the subject vehicle and starting the lane change; and controlling a travel position of the subject vehicle on the first lane within the preparation time.

10 Claims, 6 Drawing Sheets

(52) U.S. Cl.
CPC . *B60W 2552/53* (2020.02); *B60W 2554/4041* (2020.02); *B60W 2554/4045* (2020.02); *B60W 2554/801* (2020.02); *B60W 2554/802* (2020.02); *B60W 2720/10* (2013.01); *B60W 2720/12* (2013.01)

(58) Field of Classification Search
CPC . B60W 2554/4041; B60W 2554/4045; B60W 2554/801; B60W 2554/802; B60W 2720/10; B60W 2720/12
See application file for complete search history.

(56) References Cited

U.S. PATENT DOCUMENTS

| | | | |
|---|---|---|---|
| 2016/0304097 A1 | 10/2016 | Taira et al. | |
| 2018/0174467 A1 | 6/2018 | Fukuda et al. | |
| 2018/0293894 A1 | 10/2018 | Zhang | |
| 2018/0354518 A1* | 12/2018 | Inou | B60W 30/18163 |
| 2019/0202457 A1* | 7/2019 | Kito | B60W 30/18163 |
| 2019/0225236 A1* | 7/2019 | Hashimoto | B60W 50/08 |

\* cited by examiner

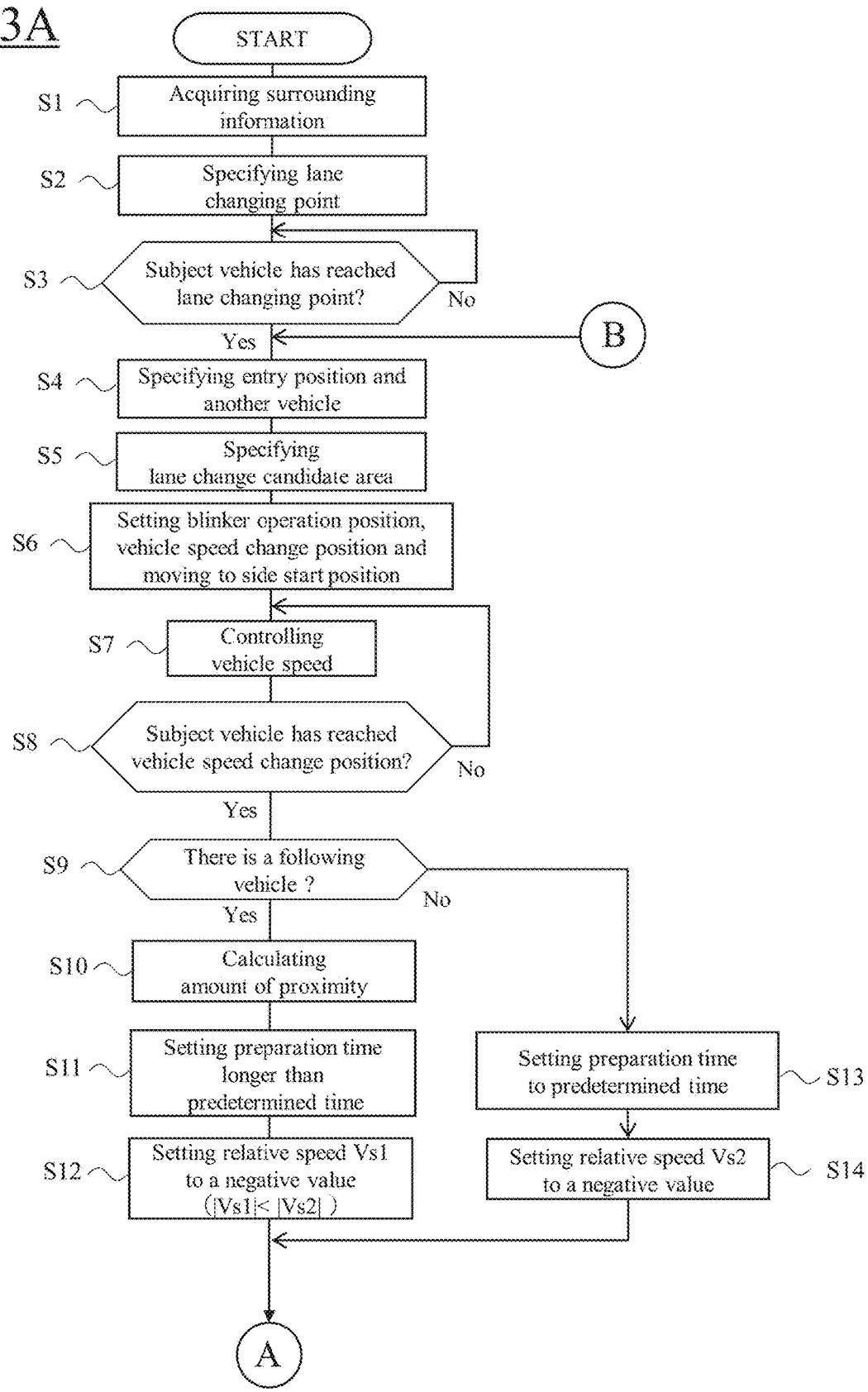

FIG. 5A
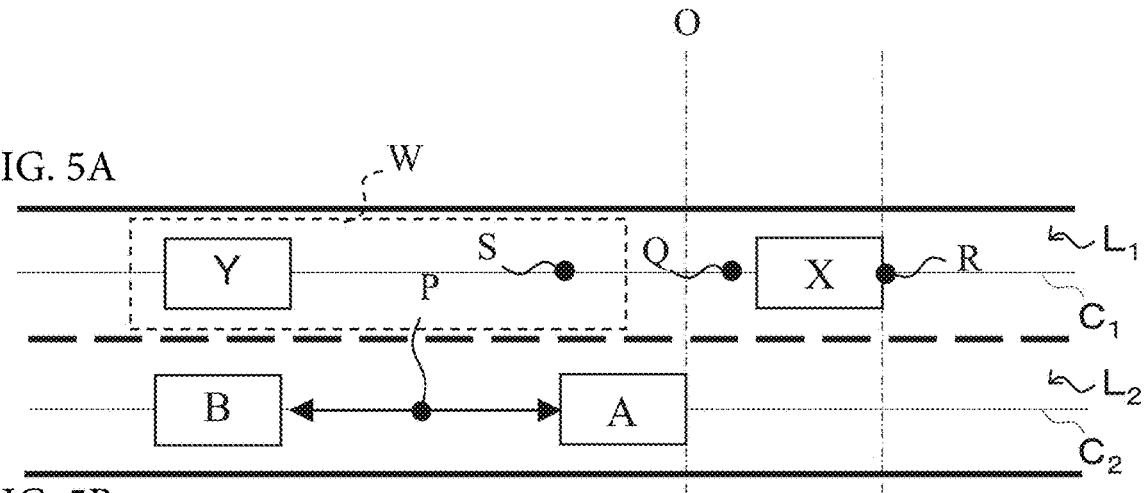
FIG. 5B
FIG. 5C
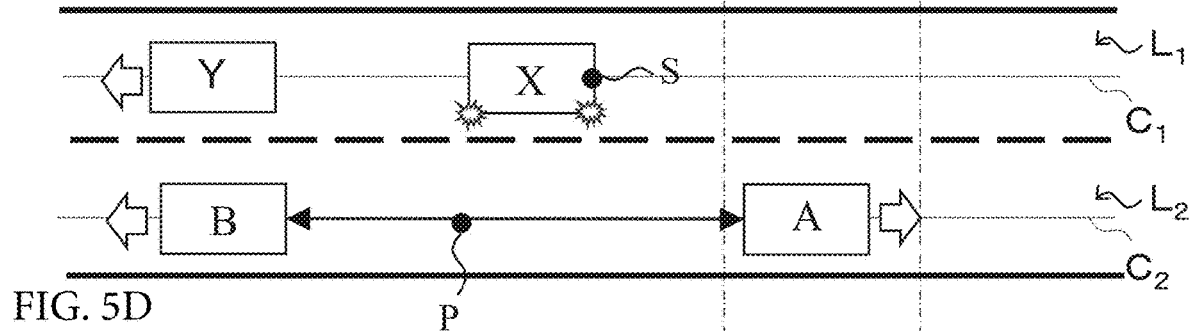
FIG. 5D
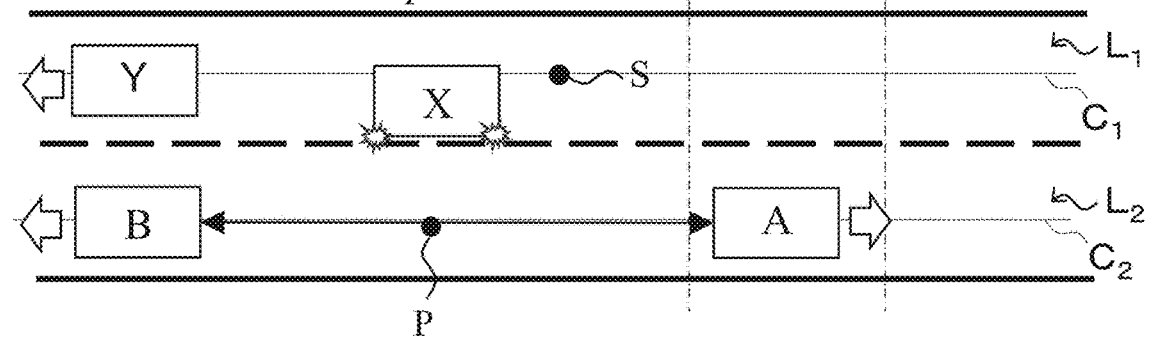

VEHICLE CONTROL METHOD AND VEHICLE CONTROL DEVICE

TECHNICAL FIELD

The present invention relates to a vehicle control method and a vehicle control device.

BACKGROUND

The vehicle travel control apparatus is known for executing a lane change of a vehicle traveling in a travel lane from the travel lane to an adjacent lane which is adjacent to the travel lane and congested (JP2016-203745A). When it is determined that there is no space into which the vehicle enters, the vehicle travel control apparatus controls the vehicle to move along a travel trajectory predetermined to perform the lane change, and to wait at a standby position on the lane boundary between the travel lane and the adjacent lane, or at a standby position within a predetermined distance from the lane boundary in the travel lane. When it is determined that there is the space while the vehicle is waiting, the vehicle travel control apparatus controls the vehicle to move from the standby position to the space.

SUMMARY

Incidentally, when there is a following vehicle which follows the subject vehicle in the situation in which the subject vehicle performs the lane change, the driver of the following vehicle confirms the forward situation during the time from operating a blinker of the subject vehicle to starting the lane change. In the prior art, the time from operating the blinker of the subject vehicle to starting the lane change may be shortened because the lane change is started at the timing when it is determined that there is the space regardless of the presence or absence of the following vehicle. In this case, there is a problem that the time for the driver of the following vehicle to confirm the forward situation is short.

A problem to be solved by present invention is to provide a vehicle control method and vehicle control device which can lengthen the time for the driver of the following vehicle to confirm the forward situation in the scene of lane change of the subject vehicle.

The present invention solves the above problem through acquiring surrounding information of the subject vehicle, specifying, based on the surrounding information, an entry position indicating a position of an entry destination of the subject vehicle, the entry position being located on an adjacent lane (a second lane) adjacent to a subject lane (a first lane) in which the subject vehicle is traveling, when operating a blinker of the subject vehicle, decelerating the subject vehicle, and executing a lane change of the subject vehicle, determining whether or not there is a following vehicle which follows the subject vehicle in a predetermined area located behind the subject vehicle on a first lane, and when determining that there is the following vehicle, setting a preparation time longer than the preparation time when determining that there is not the following vehicle, the preparation time indicating a time from operating the blinker of the subject vehicle to decelerating the subject vehicle and starting the lane change of the subject vehicle and controlling a travel position of the subject vehicle on the first lane within the preparation time.

According to the present invention, in the scene of lane change of a subject vehicle, it is possible to lengthen the time for the driver of a following vehicle to confirm the forward situation.

BRIEF DESCRIPTION OF THE DRAWINGS

FIG. 3A is a flow chart of a lane change process executed by a vehicle control device according to one or more embodiments of the present invention;

FIGS. 5A-5D are examples of the travel of the subject vehicle when the process shown in FIG. 2 is executed (when there is a following vehicle).

DETAILED DESCRIPTION

Hereinafter, embodiments of the present invention will be described with reference to the drawings. The present embodiment will be described by exemplifying a vehicle control device mounted on a vehicle.

Figure 1:
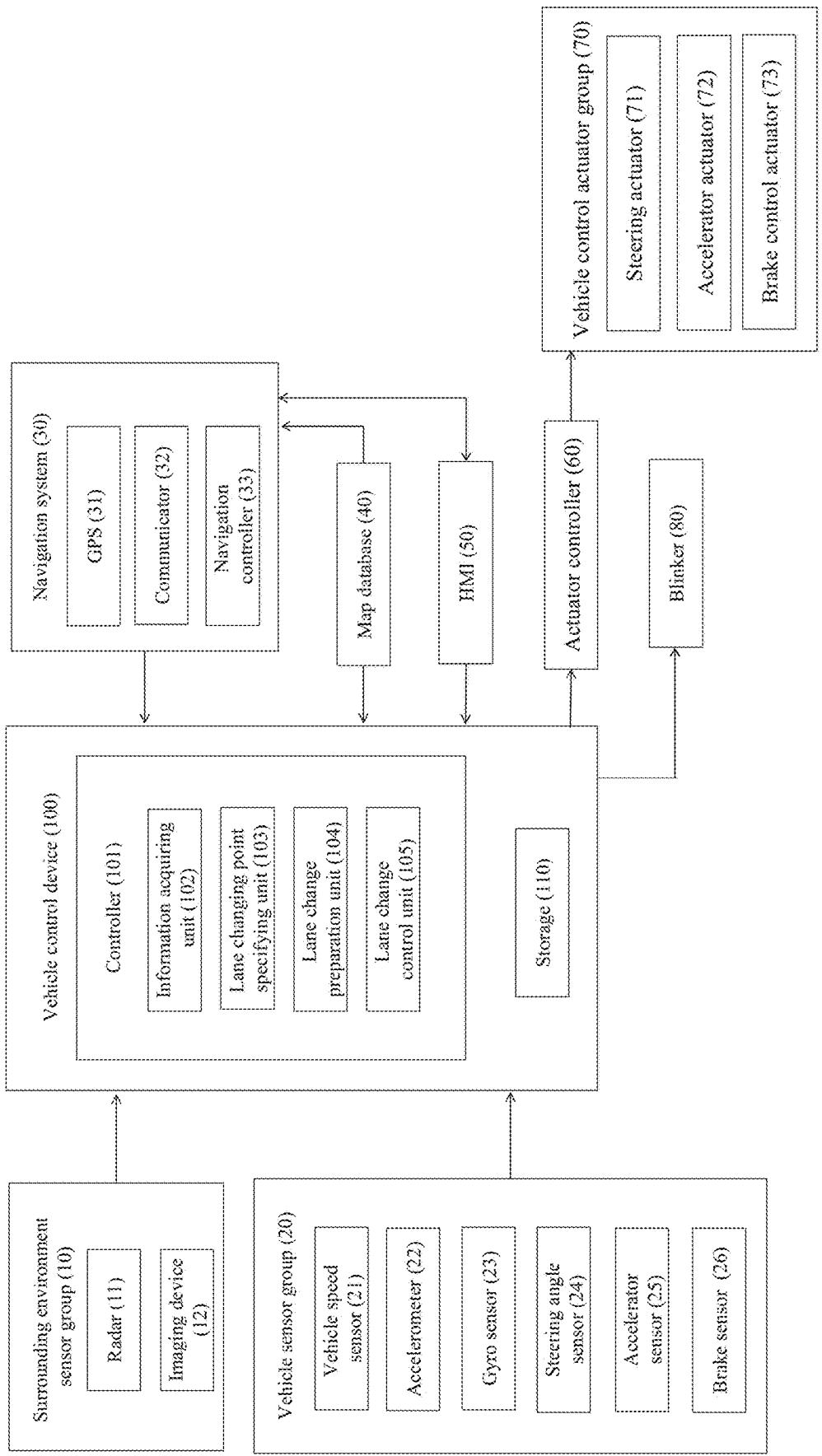
FIG. 1 is a block diagram illustrating an example of a vehicle system including an vehicle control device according to one or more embodiments of the present invention.

FIG. 1 is a block diagram illustrating an example of a vehicle system 200 including a vehicle control device 100 according to an embodiment of the present invention. The vehicle system 200 of the present embodiment is mounted on the vehicle. The vehicle system 200 is a system for the vehicle to autonomously change the lane.

As shown in FIG. 1, the vehicle system 200 according to the present embodiment includes a surrounding environment sensor group 10, a vehicle sensor group 20, a navigation system 30, a map database 40, a HMI 50, an actuator controller 60, a vehicle control actuator group 70, a blinker 80, and a vehicle control device 100. These devices or systems are connected to each other by a control area network (CAN) or other in-vehicle LAN for mutually exchanging information.

The surrounding environment sensor group 10 is a sensor group for detecting the state (external state) of the surroundings of the subject vehicle. The surrounding environment sensor group 10 is provided in the subject vehicle. As shown in FIG. 1, the surrounding environment sensor group 10 includes, for example, a radar 11 and an imaging device 12 but is not limited to the radar 11 and the imaging device 12.

The radar 11 detects objects around the subject vehicle. The radar 11 includes, for example, a millimeter wave radar, a laser radar, an ultrasonic radar, and a laser rangefinder, but is not limited. The radar 11 detects any object, for example, by transmitting radio waves to the surroundings of the subject vehicle and receiving the radio waves reflected by the object. Specifically, the radar 11 detects the direction and the distance to the object. The radar 11 also detects the relative velocity (including the direction of movement) of the object relative to the subject vehicle based on the time change of the direction to the object and the time change of the distance to the object. The radar 11 outputs the detected results to the vehicle control device 100.

In the present embodiment, the radar 11 is intended to detect the omni-directional from the subject vehicle. For example, the radar 11 is provided on the front, side, and rear of the subject vehicle, respectively, and is composed of a front radar for detecting an object in front of the vehicle, a side radar for detecting an object in the side of the vehicle, and a rear radar for detecting an object in the rear of the vehicle. The number and type of the radars 11 included in the subject vehicle are not particularly limited.

The imaging device 12 images the object present around the vehicle. The imaging device 12 includes, for example, a camera comprising a CCD or CMOS imaging device but is not limited. The imaging device 12 outputs the captured image to the vehicle control device 100.

In the present embodiment, the imaging device 12 is intended to image the omnidirectional from the subject vehicle. For example, the imaging device 12 is provided in front, side, and rear of the vehicle, respectively, and is composed of a front camera for imaging an object in front of the vehicle, a side camera for imaging an object on the side of the vehicle, the rear camera for detecting an object in the rear of the vehicle. The number and type of the imaging devices 12 included in the subject vehicle are not particularly limited.

The objects detected by the surrounding environment sensor group 10 include, for example, bicycles, motorcycles, vehicles (hereinafter, also referred to as other vehicles), road obstacles, traffic lights, road markings (including lane boundaries), and pedestrian crossings. For example, when another vehicle travels along the traveling direction of the subject vehicle around the subject vehicle, the radar 11 detects the direction and the distance to the other vehicle and the relative speed of the other vehicle relative to the subject vehicle based on the position of the subject vehicle. Further, the imaging device 12 captures the image in which vehicle type of the other vehicle, the size of the other vehicle, and the shape of the other vehicle can be identified.

Further, for example, when the subject vehicle is traveling in a specific lane among a plurality of lanes, the radar 11 detects a lane boundary separating the lane in which the subject vehicle is traveling and the lane located on the side of the lane, and also detects a distance from the subject vehicle to the lane boundary. Further, the imaging device 12 captures an image in which the type of the lane boundary can be identified. When the lane on which the subject vehicle is traveling has lane boundary lines on both sides, the radar 11 detects each of the distance from the subject vehicle to the lane boundaries. Further, in the following description, the lane on which the subject vehicle is traveling is referred to as the subject lane, and the lane located on the side of the subject lane is referred to as the adjacent lane.

The vehicle sensor group 20 is a sensor group for detecting the state of the subject vehicle (internal state). As shown in FIG. 1, the vehicle sensor group 20 includes, a vehicle speed sensor 21, an accelerometer 22, a gyro sensor 23, a steering angle sensor 24, an accelerator sensor 25, and a brake sensor 26, but is not particularly limited.

The vehicle speed sensor 21 measures the rotational speed of the drive system such as a drive shaft, and detects the traveling speed of the subject vehicle based on the measurement result. The vehicle speed sensor 21 is provided, for example, on a drive shaft rotating integrally with the wheels, or the wheels of the subject vehicle. The accelerometer 22 detects the acceleration of the subject vehicle. The accelerometer 22 includes a longitudinal accelerometer for detecting the acceleration in the longitudinal direction of the subject vehicle, and a lateral accelerometer for detecting the lateral acceleration of the subject vehicle. The gyro sensor 23 detects the rotating speed of the subject vehicle, that is, the amount of movement (angular velocity) of the angle of the subject vehicle per unit time. The steering angle sensor 24 detects the steering angle of the steering wheel. The steering angle sensor 24 is, for example, provided on the steering shaft of the subject vehicle. The accelerator sensor 25 detects the amount of step-in (the position of the accelerator pedal) of an accelerator pedal. The accelerator sensor 25 is provided, for example, on a shaft portion of the accelerator pedal. The brake sensor 26 detects the amount of depression of a brake pedal (the position of the brake pedal). The brake sensor 26 is provided, for example, on the shaft of the brake pedal.

The vehicle sensor group 20 outputs the detected result to the vehicle control device 100. The detection results include, for example, a vehicle speed, an acceleration (including longitudinal and lateral acceleration), an angular velocity, amount of depression of the accelerator pedal, and amount of depression of the brake pedal of the subject vehicle.

The navigation system 30 is a system for guiding the occupant (including the driver) of the subject vehicle by indicating a route from the present position of the subject vehicle to the destination based on the information of the present position of the subject vehicle. The map information is input from the map database 40 to the navigation system 30, and the information of the destination is input via the HMI 50 from the occupant of the subject vehicle to the navigation system 30. The navigation system 30 generates a travel route of the subject vehicle based on the input information. Then, the navigation system 30 outputs the information of the travel route of the subject vehicle to the vehicle control device 100 and presents the information of the travel route of the subject vehicle to the occupant of the subject vehicle via the HMI 50. Thus, the travel route from the present position to the destination is presented to the occupant.

As shown in FIG. 1, the navigation system 30 includes a GPS 31, a communicator 32, and a navigation controller 33.

The GPS 31 (Global Positioning System, GPS) acquires positional information that indicates the present position of the subject vehicle. The GPS 31 acquires the positional information of the subject vehicle by receiving radio waves transmitted from a plurality of satellite communications by a receiver. Further, the GPS 31 can detect changes in the positional information of the subject vehicle by receiving the radio waves transmitted from a plurality of satellite communications periodically.

The communicator 32 acquires surrounding information of the subject vehicle from the outside. The communicator 32 is, for example, a device capable of communicating with a server or a system provided outside the subject vehicle. The communicator 32 may communicate with a communicator mounted on the other vehicle.

For example, the communicator 32 acquires road traffic information from a road traffic information communication system (Vehicle Information and Communication System, VICS (registered trademark), hereinafter the same) by an information transmission device (beacon) or FM-multiplex broadcasting or the like provided on a road. The road traffic information includes, for example, traffic jam information, accident information, faulty vehicle information, construction information, speed regulation information, lane regulation information, and so on for each lane unit. It should be noted that the road traffic information does not necessarily include each of the above-mentioned information, and may include at least any one of the above-mentioned information.

Further, for example, when the communicator 32 has a function capable of communicating with a communicator mounted on another vehicle, the communicator 32 acquires the vehicle speed information of the other vehicle and the location information of the other vehicle. Such communication between the subject vehicle and the other vehicle is called inter-vehicle communication. The communicator 32 may acquire information such as the vehicle speed of the other vehicle as surrounding information of the subject vehicle through inter-vehicle communication.

Incidentally, the communicator 32 may obtain, from VICS, information including the position, the vehicle speed, and the traveling direction of the other vehicles as the surrounding information of the subject vehicle.

The navigation controller 33 is a computer that generates a travel route from the present position of the subject vehicle to the destination. For example, the navigation controller 33 includes a ROM (Read Only Memory) that stores a program for generating a travel route, a CPU (Central Processing Unit) that executes a program stored in the ROM, and a RAM (Random Access Memory) that functions as an accessible storage device.

The navigation controller 33 receives information on the present position of the subject vehicle from the GPS 31, road traffic information from the communicator 32, map information from the map database 40, and information on the destination of the subject vehicle from HMI 50. For example, it is assumed that the occupant of the subject vehicle has set the destination of the subject vehicle through the HMI 50. The navigation controller 33 generates a route from the present position to the destination in the lane unit as the travel route of the subject vehicle in accordance with the position information of the subject vehicle, the information of the destination of the subject vehicle, the map information, and the road traffic information. The navigation controller 33 outputs the generated travel route information to the vehicle control device 100, and presents the information to the occupant of the subject vehicle via HMI 50.

In the present embodiment, the travel route of the subject vehicle may be any route as long as the subject vehicle can arrive at the destination from the present position, and another conditions are not limited. For example, the navigation controller 33 may generate the travel route of the subject vehicle according to the conditions set by the occupant. For example, when the occupant sets the conditions such as using preferentially a toll road to arrive at the destination, the navigation controller 33 may generate a travel route using the toll road based on the map information. Further, for example, the navigation controller 33, based on the road traffic information, may generate a travel route of the subject vehicle. For example, when traffic jam occurs on the way of the shortest route to the destination, the navigation controller 33 may search the detour route and generate, as the travel route, a route having the shortest required time out of the plurality of detour routes thus searched.

The map database 40 stores map information. The map information includes road information and traffic rule information. The road information and the traffic rule information are defined by nodes and links (also referred to as road links) connecting the nodes. The links are identified at the lane level.

The road information is relates to roads on which vehicles can travel. Each road link is associated with information relating to roads such as, for example, type of road, road width, road shape, whether or not to go straight, priority relation of travel, whether or not to overtake (whether or not to enter an adjacent lane), whether or not to preform lane change, and the like, but the information associated with the road link is not limited thereto. In addition, each road link is associated with, for example, information on the location of traffic lights, the location of intersections, the approach direction of intersections, the type of intersections, and other information on intersections.

The traffic rule information is a rule that the vehicle should follow when traveling. The traffic rules may include pause on a route, park/stop prohibition, slow-moving travel, speed limit, lane change prohibition, for example. The traffic rule information in a section defined by the road link is associated with each road link. For example, lane change prohibition information is linked to a road link in a lane change prohibition section. The traffic rule information may be linked not only to a road link but also to a particular point (latitude, route) on a node or a map, for example.

The traffic rule information may include not only information on traffic rules but also information on traffic lights. For example, information of the color currently displayed by the traffic signal, and/or information of the period at which the display of the traffic signal is switched may be linked the road link of the intersection where the traffic signal is installed. The information on the traffic light is acquired from VICS, for example, by the communicator 32, or from an information transmission device (e.g., optical beacon) provided on the road. The display information of the traffic lights changes with the elapse of time. Thus, the traffic rule information is updated every predetermined cycle.

The map information stored in the map database 40 may be high-precision map information suitable for autonomous driving. The high-precision map information is acquired by, for example, communication with a server or a system provided outside the subject vehicle. Further, the high-precision map information may be generated at any time based on information acquired in real-time using the surrounding environment sensor group 10 (e.g., information of the object detected by the radar 11, the image of the surroundings of the subject vehicle captured by the imaging device 12).

Here, the autonomous driving in the present embodiment will be described. In the present embodiment, the autonomous driving indicates an driving mode other than the driving mode in which the driving entity is composed of only the driver. For example, autonomous driving corresponds to a case where the driving entity consists a controller (not shown) for supporting a driving operation together with a driver, or a case where the driving entity consists a controller (not shown) for executing a driving operation on behalf of the driver.

In the present embodiment, the configuration in which the vehicle system 200 includes the map database 40 is described as an example, but the configuration may be provided outside the vehicle system 200. For example, the map information may be previously stored in a portable storage device (e.g., an external HDD, a flash memory). In this case, by electrically connecting the vehicle control device 100 and the storage device for storing the map information, the storage device functions as the map database 40.

The HMI 50 is an interface for outputting and inputting data between a passenger of the subject vehicle and the vehicle system 200 (Human Machine Interface, HMI). Examples of the HMI 50 may include a display for displaying text or video information, and a speaker for outputting sound such as music or sound but is not limited thereto.

The transmission and reception of information via the HMI 50 will be described. For example, when an occupant inputs a destination to the HMI 50, the destination is outputted from the HMI 50 to the navigation system 30. This enables the navigation system 30 to acquire information on the destination of the subject vehicle. Further, for example, when the navigation system 30 generates a travel route to the destination, the navigation system 30 outputs the travel route information to the HMI 50. Then, the HMI 50 outputs the information of the travel route from the display and/or the speaker. Thus, the information of the travel route to the destination is presented to the occupant of the subject vehicle. The information on the travel route to the destination may include, for example, route guidance and required time to the destination.

Further, for example, when the occupant inputs a lane change execution command to the HMI 50 in order to execute the lane change of the subject vehicle, the lane change execution command is output from the HMI 50 to the vehicle control device 100. Thus, the vehicle control device 100 may start the control process of the lane change. Further, for example, when the vehicle control device 100 sets the target trajectory for the lane change, the information of the target trajectory is outputted from the vehicle control device 100 to the HMI 50. Then, the HMI 50 outputs the information of the target trajectory from the display and/or the speaker. Thus, the information of the target trajectory for the lane change is presented to the occupant of the subject vehicle. The information of the target trajectory for the lane change may include, for example, an entry position specified on an adjacent lane, and a target trajectory at the time of the lane change but is not limited thereto. The target trajectory and the entry position will be described later.

The actuator controller 60 controls the travel of the subject vehicle. The actuator controller 60 includes a steering control mechanism, an accelerator control mechanism, a brake control mechanism, an engine control mechanism, and the like. The actuator controller 60 receives a control signal from the vehicle control device 100 to be described later. The actuator controller 60, in response to a control signal from the vehicle control device 100, controls the vehicle control actuator group 70 to execute the autonomous driving of the subject vehicle. For example, when a control signal for moving the subject vehicle from the subject lane to the adjacent lane is input to the actuator controller 60, the actuator controller 60 calculates a steering angle required for the movement of the subject vehicle, an accelerator depression amount or a brake depression amount according to the moving speed, in accordance with the control signal. The actuator controller 60 outputs the calculated various parameters to the vehicle control actuator group 70.

The control of each mechanism may be performed completely autonomously, or may be performed in a manner to assist the driving operation of the driver. The control of each mechanism can be interrupted or stopped by an interventional operation of the driver. The travel control method by the actuator controller 60 is not limited to the above-described control method, and other well-known methods can be used.

The vehicle control actuator group 70 is various actuators for driving the subject vehicle. As shown in FIG. 1, the vehicle control actuator group 70 may include a steering actuator 71, an accelerator actuator 72, and a brake control actuator 73 but is not limited thereto.

The steering actuator 71 controls the steering direction and the steering amount of the steering of the subject vehicle in response to a signal input from the actuator controller 60. The accelerator actuator 72 controls the degree of acceleration of the subject vehicle in response to a signal input from the actuator controller 60. The brake control actuator 73 controls the braking operation of the brake device of the subject vehicle in response to a signal input from the actuator controller 60.

The blinker 80 has a lamp for blinking inside. When the driver of the subject vehicle operates the direction instruction switch (not shown), the blinker 80 lights up in orange. The blinker 80 is a device for indicating the direction to the surroundings when the subject vehicle turns right or left, or performs the lane change. The blinker 80, for example, is integrally provided on the left and right of the front and rear ends of the subject vehicle.

Further, in the present embodiment, the control signal is input from the vehicle control device 100 to the blinker 80. The control signal is a signal for operating the blinker, and may include a signal for blinking the blinker 80 that is turned off (also referred to as a blinking signal) and a signal for turning off the blinker 80 that is blinking (also referred to as a turn-off signal). For example, when a blinking signal is input to the blinker 80 to blink the left blinker, the blinker 80 lights the left blinker. When the turn-off signal to turn off the left blinker is input to the blinker 80, the blinker 80 turns off the left blinker. Thus, the blinker 80 is controlled by the vehicle control device 100 as well as the driver of the subject vehicle.

Next, the vehicle control device 100 will be described. The vehicle control device 100 according to one or more embodiments of the present invention is configured by a computer installed with hardware and software. Specifically, the vehicle control device 100 is configured to include a read only memory (ROM) that stores programs, a central processing unit (CPU) that executes the programs stored in the ROM, and a random access memory (RAM) that serves as an accessible storage device. As the operation circuits, MPU (Micro Processing Unit), DSP (Digital Signal Processor), ASIC (Application Specific Integrated Circuit), and FPGA (Field Programmable Gate Array) can be used instead of or in addition to CPU. The controller 101 shown in FIG. 1 corresponds to a CPU (a processer). The storage 110 shown in FIG. 1 corresponds to a ROM and a RAM.

In the present embodiment, a program to be executed by the controller 101 is stored in advance in the storage 110, but the program may be stored in other device. For example, the program may be stored on a computer-readable and portable computer-readable recording medium (e.g., disk media, flash memory, etc.). In this case, the controller 101 executes a program downloaded from a computer-readable recording medium. In other words, the vehicle control device 100 may be configured to include only the operating circuit and download the program externally.

As shown in FIG. 1, the controller 101 includes, as function blocks, an information acquiring unit 102, a lane changing point specifying unit 103, a lane change preparation unit 104, and a lane change control unit 105. These blocks enables the functions described later by the software established in the ROM. In the present embodiment, the functions of the controller 101 are divided into four function blocks, and the functions of the respective function blocks are described. However, the functions of the controller 101 need not necessarily be divided into four blocks, and may be divided into three or less function blocks or five or more function blocks. The function of the controller 101 is not limited to the function of the function block described below, but includes, for example, a control function of a navigation system.

The function of the information acquiring unit 102 will be described. The information acquiring unit 102 acquires various information from a surrounding environment sensor group 10, a vehicle sensor group 20, a navigation system 30, a map database 40, and a HMI 50.

The information acquiring unit 102 acquires surrounding information (also referred to as external information of the subject vehicle) of the subject vehicle, which is detected by the surrounding environment sensor group 10. The surrounding information of the subject vehicle includes a detection result detected by the radar 11, and a captured image captured by the imaging device 12. Further, the information acquiring unit 102 acquires information (also referred to as internal information of the subject vehicle) indicating the state of the subject vehicle, which is detected by the vehicle sensor group 20. The internal information of the subject vehicle includes the vehicle speed, acceleration, angular velocity, the amount of depression of the accelerator pedal, and the amount of depression of the brake pedal. Further, the information acquiring unit 102 acquires the present position of the subject vehicle, the travel route of the subject vehicle, and the road traffic information from the navigation system 30. The information acquiring unit 102 acquires map information (including road information and traffic rule information) from the map database 40.

The lane changing point specifying unit 103 acquires the present position of the subject vehicle and the travel route of the subject vehicle from the navigation system 30 and specifies the lane changing point in accordance with the present position of the subject vehicle and the travel route. The lane changing point indicates a point where the vehicle needs to be moved from the subject lane to the adjacent lane when traveling in the travel route. The lane changing point specifying unit 103 specifies a point where the lane change is to be performed in the travel route by referring to the travel route of the subject vehicle.

The lane changing point specifying unit 103 specifies, from the travel route of the subject vehicle, a point where traveling direction is switched such as an intersection, or a point where the course changes in a direction different from the travel direction of the vehicle such as a interchange, as a target point. Next, the lane changing point specifying unit 103 specifies, as a lane changing point, a point where the vehicle needs to be moved to the adjacent lane from the subject lane, in order to change the travel direction of the subject vehicle at the target point.

For example, when the travel route is set to a route where the subject vehicle turns right at an intersection ahead of the present position, and the subject vehicle is traveling in the leftmost lane of a plurality of lanes, the subject vehicle needs to move from the leftmost lane to the right lane for turning right. In such a scene, the lane changing point specifying unit 103 specifies an intersection where a right turn is required as a target point. The lane changing point specifying unit 103 specifies, as a lane changing point, a point on the travel lane which is a predetermined distance ahead of the intersection (target point) where a right turn should be made. For example, the lane changing point is set at a position several hundred meters ahead of the target point on the travel route. The lane changing point does not necessarily need to be set at a point, but it may be set as a predetermined section. As another example, the lane changing point may include a predetermined section in front of the branch point provided on the expressway and a predetermined section in front of the destination of the subject vehicle. The branch point provided on the expressway may include the branch points to each direction and the branch points between the main line and the exit. In the present embodiment, when the lane changing point is specified as the section, the length of the section of the lane changing point is not particularly limited.

In the present embodiment, when the subject vehicle has reached the lane changing point after the lane changing point has been specified by the lane changing point specifying unit 103, or when a command to perform a lane change is input by the occupant, the lane change process in which the subject vehicle autonomously performs the lane change is performed by the functions described below.

The lane change preparation unit 104 executes the preparation control for executing the lane change of the subject vehicle when the present position of the subject vehicle has reached the lane changing point. The preparation control includes specifying an entry position, specifying a lane change candidate area, setting a blinker operation position for operating the blinker, controlling a vehicle speed, setting a preparation time, and operating the blinker. The preparation control includes the determination of the presence or absence of the following vehicle. The lane change preparation unit 104 sets the preparation time according to the presence or absence of the following vehicle and executes the vehicle speed control so as to satisfy the condition of the preparation time. The difference in the vehicle speed control according to the presence or absence of the following vehicle will be described later. In one or more embodiments of the present invention, the vehicle speed control is used as an example for explanation. However, it is not limited to the vehicle speed control as long as it is a method used to control the position in which the subject vehicle is traveling (the travel position of the subject vehicle) in the subject lane. For example, a steering control may be executed in place of or together with the vehicle speed control.

The lane change preparation unit 104 specifies an entry position which indicates the position of the entry destination of the subject vehicle and is located on the adjacent lane adjacent to the subject lane in which the subject vehicle travels in accordance with the surrounding information of the subject vehicle. For example, the lane change preparation unit 104 specifies, as the entry position, a place, on the adjacent lane, that has a distance along the travel direction of the vehicle is equal to or longer than a predetermined distance based on the result detected by the radar 11 and the captured image captured by the imaging device 12.

Further, when specifying the entry position, the lane change preparation unit 104 specifies, among other vehicles located in front of and/or behind the entry position, the other vehicle located ahead as a front vehicle, and the other vehicle located behind as a rear vehicle. That is, the lane change preparation unit 104 specifies a front vehicle located in front of the entry position, and a rear vehicle located behind the entry position among a plurality of other vehicles located in the adjacent lane. For example, the lane change preparation unit 104 specifics, as a front vehicle, other vehicle that is closest to the entry position among a plurality of other vehicles located in front of the entry position in the adjacent lane based on the result detected by the radar 11 and the captured image captured by the imaging device 12. Also, the lane change preparation unit 104 specifies, as a rear vehicle, other vehicle that is closest to the entry position among a plurality of other vehicles located behind the entry position in the adjacent lane. Incidentally, when specifying the front vehicle and the rear vehicle, the lane change preparation unit 104 may designates a predetermined area located in front of the entry position in advance, and specify the other vehicle existing in the predetermined area as the front vehicle. For example, the lane change preparation unit 104 designates, as the predetermined area, an area having a length in the direction along the travel direction of the subject vehicle based on the vehicle speed of the subject vehicle. The predetermined area is not particularly limited. The predetermined area may be a predetermined area stored in a storage device such as a ROM. Incidentally, when there is not the other vehicle traveling behind the entry position, the lane change preparation unit 104 may specify only the front vehicle.

When specifying at least the front vehicle, the lane change preparation unit 104 specifies a predetermined area located behind the front vehicle as a candidate area for the lane change (hereinafter also referred to as a lane change candidate area) on the adjacent lane. When the rear vehicle is traveling behind the front vehicle, the lane change preparation unit 104 specifies an area between the front vehicle and the rear vehicle as the lane change candidate area. When no other vehicle is traveling behind the front vehicle, the lane change preparation unit 104 sets the lane change candidate area so that the length of the lane change candidate area becomes a predetermined length along the travel direction of the subject vehicle.

The lane change preparation unit 104 sets the blinker operation position and controls the lighting timing of the blinker 80 in order to inform vehicles traveling on the subject lane and on the adjacent lane of the intention of the lane change. In addition, the lane change preparation unit 104 sets a vehicle speed change position for changing the vehicle speed of the subject vehicle and controls the vehicle speed of the subject vehicle until the subject vehicle reaches the vehicle speed change position in order to inform vehicles traveling on the subject lane and on the adjacent lane of the intention of the lane change. In addition, the lane change preparation unit 104 sets the moving to side start position for moving the subject vehicle to a side of a lane and controls the moving to side start timing for moving the subject vehicle to a side of a lane in order to inform vehicles traveling on the subject lane and on the adjacent lane of the intention of the lane change. In addition, when the subject vehicle has reached the vehicle speed change position, the lane change preparation unit 104 determines the presence or absence of the following vehicle and sets the preparation time according to the presence or absence of the following vehicle. The lane change preparation unit 104 also controls the vehicle speed of the subject vehicle according to the preparation time. Hereinafter, the respective controls will be described.

The lane change preparation unit 104 sets the blinker operation position based on the vehicle speed of the subject vehicle, the vehicle speed of the front vehicle, and the position of the front vehicle. The blinker operation position represents a position where the blinker begins to blink to inform the front vehicle of the intention of the lane change. The blinker operation position is expressed as a position relative to the position of the front vehicle when specifying the lane change candidate area. The blinker operation position is set on the subject lane. The blinker operation position is set to a range where the blinker of the subject vehicle is visible to the driver of the front vehicle traveling on the adjacent lane. In addition, the blinker operation position is set to a position where blinking of the blinker is easily visible to the driver of the front vehicle.

The lane change preparation unit 104 sets the vehicle speed change position at a predetermined distance away from the blinker operation position in the travel direction of the subject vehicle. The predetermined distance is, for example, the length of the total length of the subject vehicle. The predetermined distance may be the total length of the other vehicle. The vehicle speed change position is set at a position which is in front of the front vehicle which the lane change preparation unit 104 informs of the intention of the lane change, and is in front of the blinker operation position. The vehicle speed change position is expressed as a position relative to the front vehicle, as well as the blinker operation position. The vehicle speed change position may be a position ahead of the position of the front vehicle by a length obtained by multiplying the distance from the position of the front vehicle to the blinker operation position by a fixed ratio.

The lane change preparation unit 104 sets the moving to side start position at a position that is a predetermined distance away from the blinker operation position in the direction opposite to the travel direction of the subject vehicle. The predetermined distance is the experimentally determined distance, not the distance to be particularly limited. The moving to side start position is set to a position which is behind the vehicle speed change position and further is behind the blinker operation position. The moving to side start position is expressed as the position relative to the front vehicle as well as the blinker operation position and the vehicle speed change position.

The lane change preparation unit 104 controls the vehicle speed of the subject vehicle so that the position of the subject vehicle reaches the vehicle speed change position from a state where the subject vehicle is traveling around the front vehicle. For example, when the position of the subject vehicle is traveling behind the vehicle speed change position in the state in which the subject vehicle and the front vehicle are traveling in parallel, the lane change preparation unit 104 outputs a control signal for controlling the vehicle speed to the actuator controller 60 so that the vehicle speed of the subject vehicle is greater than the vehicle speed of the front vehicle.

When the present position of the subject vehicle has reached the vehicle speed change position, the lane change preparation unit 104 determines whether or not there is a following vehicle which follows the subject vehicle in a predetermined area located behind the subject vehicle in the subject lane. For example, the lane change preparation unit 104 determines whether or not the following vehicle is traveling within the predetermined area located behind the subject vehicle based on the result detected by the radar 11 and the captured image captured by the imaging device 12. The predetermined area is predetermined and stored in a storage device such as a ROM. The predetermined area is, for example, an area having a length in the direction along the travel direction of the subject vehicle based on the vehicle speed of the subject vehicle, but is not limited to the area. The position of the predetermined area is represented by, for example, a position relative to the entry position. The position of the predetermined areas includes, but is not limited to, a position on the adjacent lane such that the entry position and the position of the predetermined area are laterally aligned in the vehicle-width direction of the subject vehicle.

The lane change preparation unit 104 sets a different preparation time according to the determination result of the presence or absence of the following vehicle. The preparation time is the time from operating the blinker of the subject vehicle to starting the lane change of the subject vehicle. Specifically, in one or more embodiments of the present invention, the preparation time includes the time required from the time the subject vehicle reaches the blinker operation position to the time the subject vehicle moves to the moving to side start position, and the time required from the time the subject vehicle reaches the moving to side start position to the time the subject vehicle starts the lane change.

The lane change preparation unit 104 sets the preparation time longer when it is determined that there is the following vehicle, as compared with the preparation time when it is determined that there is not the following vehicle. Then, the lane change preparation unit 104 controls the vehicle speed of the subject vehicle so that the time from when the blinker of the subject vehicle is operated to when the subject vehicle starts to move to a side of a lane becomes the set preparation time. The following explanation describes how to control the vehicle speed of the subject vehicle according to the preparation time.

The lane change preparation unit 104 sets the vehicle speed of the subject vehicle so that the relative speed of the subject vehicle relative to the front vehicle is negative, and changes the vehicle speed of the subject vehicle. The relative speed of the subject vehicle relative to the front vehicle is negative, so the subject vehicle moves backward relative to the front vehicle. The driver of the front vehicle can recognize from the movement of the subject vehicle that the subject vehicle does not enter the space in front of the front vehicle.

In addition, when setting the vehicle speed of the subject vehicle, the lane change preparation unit 104 sets the vehicle speed of the subject vehicle so that the relative speed becomes a speed corresponding to the preparation time while making the relative speed of the subject vehicle relative to the front vehicle negative. Specifically, when it is determined that there is a following vehicle, the lane change preparation unit 104 sets the vehicle speed of the subject vehicle so that the absolute value of the relative speed becomes smaller than when it is determined that there is not a following vehicle. In other words, when it is determined that there is a following vehicle, the lane change preparation unit 104 sets the vehicle speed of the subject vehicle so that the difference in the vehicle speed between the vehicle speed of the front vehicle and the vehicle speed of the subject vehicle becomes smaller as compared with when it is determined that there is no following vehicle. Thus, when it is determined that there is a following vehicle, the speed at which the subject vehicle moves backward relative to the front vehicle becomes smaller as compared with when it is determined that there is no following vehicle. When the speed at which the subject vehicle moves backward relative to the front vehicle becomes smaller, the time required for the subject vehicle to reach the moving to side start position from the blinker operation position and the time required for the subject vehicle to start the lane change from the moving to side start position will be longer.

Furthermore, when it is determined that there is a following vehicle, the lane change preparation unit 104 determined how small the difference in the vehicle speed between the vehicle speed of the front vehicle and the vehicle speed of the subject vehicle is in comparison with the case where it is determined that there is no following vehicle, according to an amount of proximity between the subject vehicle and the following vehicle.

When it is determined that there is a following vehicle, the lane change preparation unit 104 calculates the amount of the proximity between the subject vehicle and the following vehicle based on the surrounding information of the subject vehicle. For example, the lane change preparation unit 104 calculates THW (Time Head way) or TTC (Time to Collision) based on the vehicle-to-vehicle distance between the subject vehicle and the following vehicle. THW is a value obtained by dividing the vehicle-to-vehicle distance between the subject vehicle and the following vehicle by the vehicle speed of the subject vehicle. TTC is a value obtained by dividing the vehicle-to-vehicle distance between the subject vehicle and the following vehicle by the relative speed of the following vehicle relative to the subject vehicle. The lane change preparation unit 104 calculates the amount of the proximity between the subject vehicle and the following vehicle using at least one of the vehicle-to-vehicle distance between the subject vehicle and the following vehicle, THW, and TTC. Taking THW as an example, the lane change preparation unit 104 increases the amount of the proximity between the subject vehicle and the following vehicle as the value of THW increases. The explanation is omitted, but the lane change preparation unit 104 similarly calculates the amount of the proximity between the subject vehicle and the following vehicle even when the vehicle-to-vehicle distance or TTC is used.

Figure 2:
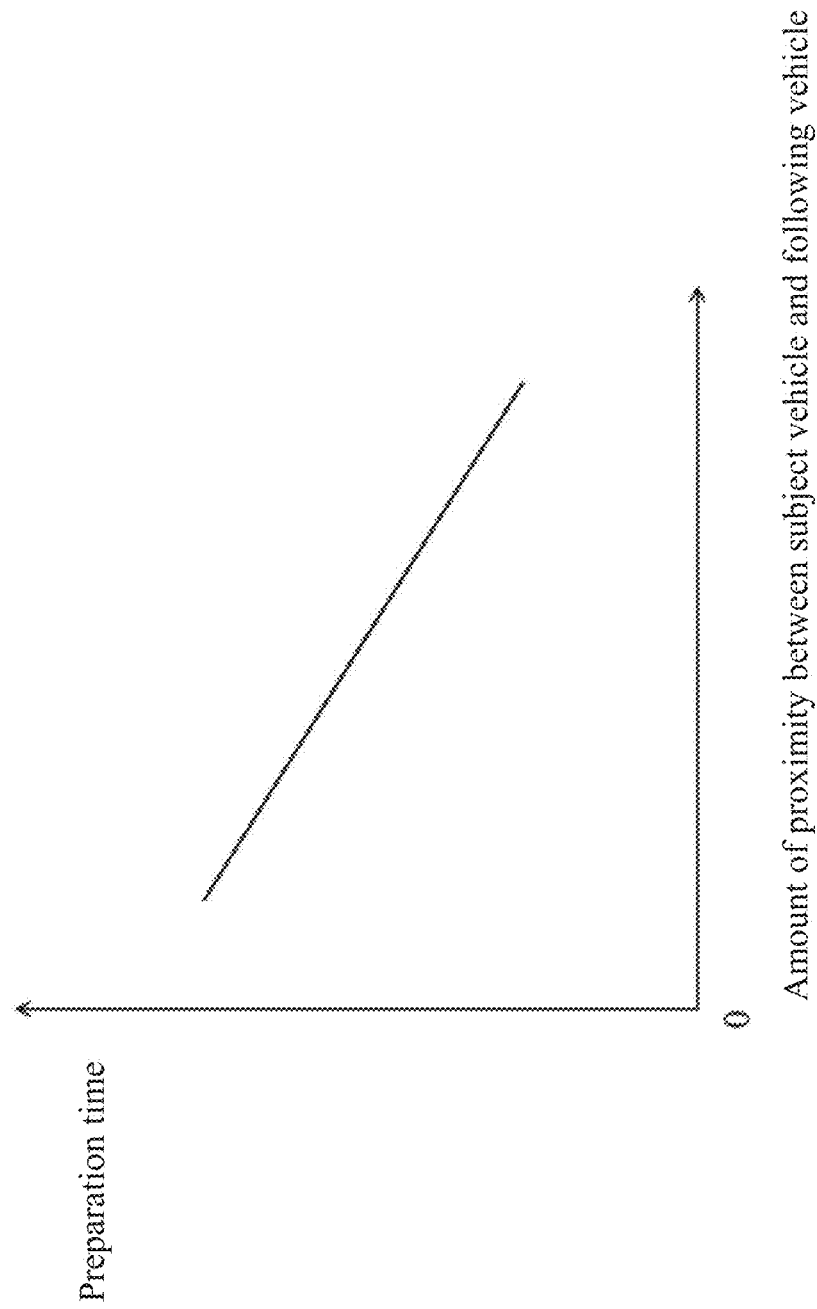
FIG. 2 shows an example of the relation between the amount of the proximity between the subject vehicle and the following vehicle and the preparation time.

FIG. 2 shows an example of the relation between the amount of the proximity between the subject vehicle and the following vehicle and the preparation time. In FIG. 2, the horizontal axis indicates the amount of the proximity between the subject vehicle and the following vehicle. The vertical axis indicates the preparation time. The horizontal axis shows that on the left hand side, the amount of the proximity between the subject vehicle and the following vehicle is higher. The vertical axis indicates that the preparation time is longer on the upper side. As shown in FIG. 2, the lane change preparation unit 104 sets the vehicle speed of the subject vehicle so that the higher the amount of the proximity between the subject vehicle and the following vehicle, the longer the preparation time will be. That is, the lane change preparation unit 104 sets the vehicle speed of the subject vehicle so that the higher the amount of the proximity between the subject vehicle and the following vehicle, the smaller the difference in the vehicle speed between the vehicle speed of the subject vehicle and the vehicle speed of the following vehicle. In the example of FIG. 2, although the amount of the proximity between the subject vehicle and the following vehicle and the preparation time are expressed as a proportional relationship, the proportional constant need only be negative, and its size is not limited. Further, when setting the vehicle speed of the subject vehicle according to the amount of the proximity, it is not limited to the relationship between the preparation time and the amount of the proximity, and, for example, the relationship between the addition time to be added for a predetermined time and the amount of the proximity may be used.

The lane change control unit 105 operates the blinker 80 and starts blinking of the blinker 80 when the subject vehicle moves backward relative to the front vehicle from the vehicle speed change position and the position of the subject vehicle reaches the blinker operation position. At this time, blinking of the blinker 80 starts at the point within the area where blinking of the blinker 80 is visible to the driver of the front vehicle. Therefore, the driver of the front vehicle can recognize that the subject vehicle is approaching the rear of the front vehicle. That is, the driver of the front vehicle can understand the intention of the lane change of the subject vehicle by recognizing that subject vehicle is moving backward from the position in front of the front vehicle and that blinking of the blinker is operated.

The lane change control unit 105 starts to move the subject vehicle to a side of a lane by controlling the steering angle of the subject vehicle when the subject vehicle moves backward relative to the front vehicle from the blinker operation position and the position of the subject vehicle reaches the moving to side start position. At this time, in one or more embodiments of the present invention, the lane change control unit 105 controls the steering of the subject vehicle without controlling the vehicle speed of the subject vehicle. For example, the lane change control unit 105 controls the steering of the subject vehicle so that the subject vehicle is positioned between the lane boundary on the adjacent lane side and the centerline of the subject lane along the travel direction of the subject vehicle. The lane change control unit 105 calculates the travel distance required for moving the subject vehicle to a side of lane from the present position of the subject vehicle and sets the steering angle required for moving. Then, the lane change control unit 105 outputs a control signal including the set content to the actuator controller 60.

The lane change control unit 105 measures the length of the lane change candidate area and compares the length of the lane change candidate area with the predetermined determination threshold when the subject vehicle travels next to the lane change candidate area by moving to the adjacent lane side from the moving to side start position. The length of the lane change candidate area is a length in the direction along the travel route. The determination threshold is a threshold for determining that the lane change is possible, and is set in advance. For example, the determination threshold is set to a length where a predetermined length (e.g., 6 m) can be secured respectively in front of and behind the vehicle. Incidentally, the determination threshold may be changed according to the vehicle speed of the other vehicle on the adjacent lane and/or the vehicle speed of the subject vehicle and so on.

When the length of the lane change candidate area is equal to or greater than the determination threshold, the lane change control unit 105 generates a target trajectory for the subject vehicle to perform the lane change, which is a trajectory from the present position of the subject vehicle as a start point to the entry position within the lane change candidate area as an end point. The lane change control unit 105 sets the vehicle speed and steering angle when the subject vehicle travels along the target trajectory. The lane change control unit 105 outputs a control signal corresponding to the set vehicle speed and steering angle to the actuator controller 60. When the position of the subject vehicle has reached the entry position, the lane change control unit 105 stops blinking the blinker 80 and terminates the lane change control.

Figure 3B:
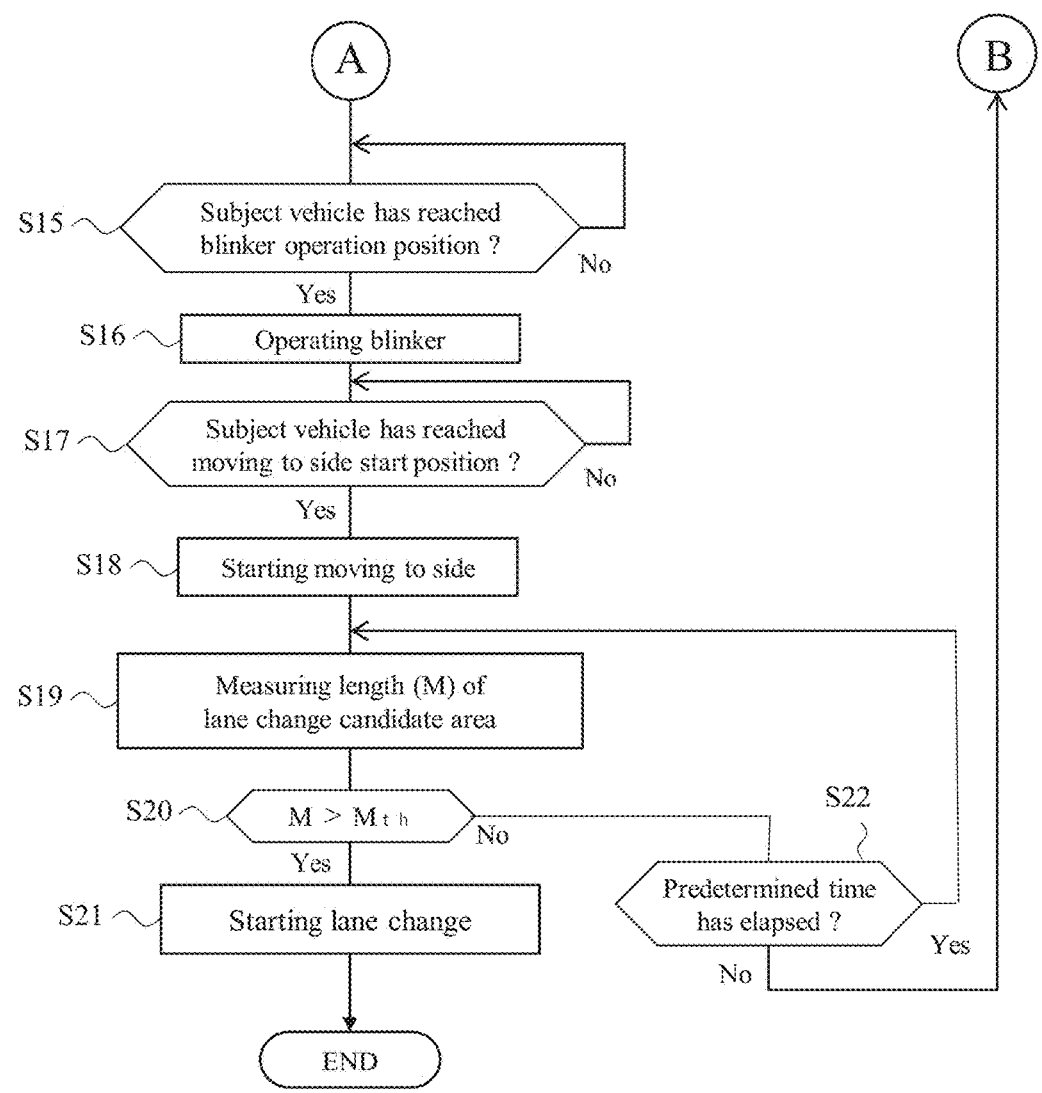
FIG. 3B is a flow chart of a lane change process executed by a vehicle control device according to one or more embodiments of the present invention.

Next, referring to FIGS. 3A and 3B, the control flow of the controller 101 will be described. FIGS. 3A and 3B shows a flow chart of the control process performed by the vehicle control device according to one or more embodiments of the present invention. The control of each mechanism may be performed completely autonomously, or may be performed in a manner to assist the driving operation of the driver.

In step S1, the controller 101 acquires external information (surrounding information) of the subject vehicle from the surrounding environment sensor group 10. The controller 101 acquires internal information of the subject vehicle. Incidentally, the controller 101, while executing the control process after step S2, acquires the external information and the internal information of the subject vehicle at a predetermined cycle. The travel state is indicated by the position of the vehicle, the vehicle speed of the vehicle, etc.

In step S2, the controller 101 specifies the lane changing point based on the travel route of the subject vehicle. In step S3, the controller 101 compares the present position of the subject vehicle with the lane changing point, and determines whether or not the subject vehicle has reached the lane changing point. When the present position of the subject vehicle has not reached the lane changing point, the controller 101 repeatedly executes the control process of step S3. When the present position of the subject vehicle has reached the lane changing point, the controller 101 executes the control process in step S4 and subsequent steps.

In step S4, the controller 101 specifies the entry position of the subject vehicle on the adjacent lane from the surrounding information of the subject vehicle and specifies the other vehicle located in front of the entry position as the front vehicle. In step S5, the controller 101 specifies the lane change candidate area behind the front vehicle on the adjacent lane.

In step S6, the controller 101 sets he blinker operation position within a predetermined range located in front of the front vehicle on the subject lane. The controller 101 also sets the vehicle speed change position in front of the blinker operation position. In addition, the controller 101 sets the moving to side start position behind the blinker operation position.

In step S7, the controller 101 controls the vehicle speed of the subject vehicle so that the present position of the subject vehicle approaches the vehicle speed change position based on the present position of the subject vehicle, the vehicle speed of the subject vehicle, the present position of the front vehicle, the vehicle speed of the front vehicle, and the vehicle speed change position. For example, when the subject vehicle is located behind the front vehicle and the vehicle speed of the subject vehicle is lower than the vehicle speed of the front vehicle, the controller 101 controls the vehicle speed so that the vehicle speed of the subject vehicle is higher than the vehicle speed of the front vehicle. As another example, when the subject vehicle is located ahead of the front vehicle and the vehicle speed of the subject vehicle is lower than the vehicle speed of the front vehicle, the controller 101 controls the vehicle speed of the subject vehicle so that the present vehicle speed of the subject vehicle is maintained.

In step S8, the controller 101 compares the present position of the subject vehicle with the vehicle speed change position, and determines whether or not the present position of the subject vehicle has reached the vehicle speed change position. When the present position of the subject vehicle has not reached the vehicle speed change position, the controller 101 repeatedly executes the control process of Step S8.

In step S9, the controller 101 determines whether or not there is a following vehicle which follows the subject vehicle in a predetermined area located behind the subject vehicle on the subject lane. When it is determined that there is a following vehicle, the process proceeds to step S10. On the other hand, when it is determined that there is no following vehicle, the process proceeds to step S13.

When it is determined in step S9 that there is a following vehicle, the process proceeds to step S10. In step S10, the controller 101 calculates the amount of the proximity between the subject vehicle and the following vehicle specified in step S9. For example, the controller 101 calculates the amount of the proximity based on the vehicle-to-vehicle distance between the subject vehicle and the following vehicle.

In step S11, the controller 101 sets the preparation time longer than a predetermined time set in advance. The predetermined time is an experimentally determined time and is stored in advance in the storage device such as a ROM. For example, the predetermined time is the time corresponding to the vehicle speed of the subject vehicle. The controller 101 sets the preparation time according to the amount of the proximity between the subject vehicle and the following vehicle calculated in step S10. For example, the controller 101 refers to a map showing the relationship between the amount of the proximity between the subject vehicle and the following vehicle and the preparation time as shown in FIG. 2. The controller 101 specifies the preparation time corresponding to the amount of the proximity between the subject vehicle and the following vehicle calculated in step S10.

In step S12, the controller 101 controls the subject vehicle to travel on the subject lane at a speed at which the relative speed ($V_{s1}$) of the subject vehicle relative to the front vehicle becomes negative. At this time, the controller 101 sets the vehicle speed of the subject vehicle so that the relative speed becomes a speed corresponding the preparation time set in step S11 while making the relative speed of the subject vehicle relative to the front vehicle negative. The relative speed ($V_{s1}$) of the subject vehicle relative to the front vehicle set in this step has a relationship in which the size of the absolute value is smaller than the relative speed ($V_{s2}$) of the subject vehicle relative to the front vehicle set in step S14, which will be described later.

When it is determined in step S9 that there is no following vehicle, the process proceeds to step S13. In step S13, the controller 101 sets the preparation time to a predetermined time set in advance. The predetermined time in this step is the same as the predetermined time described in step S7.

In step S14, as in step S12, the controller 101 controls the subject vehicle to travel on the subject lane at a speed at which the relative speed ($V_{s2}$) of the subject vehicle relative to the front vehicle becomes negative. At this time, the controller 101 sets the vehicle speed of the subject vehicle so that the relative speed becomes a vehicle speed corresponding to the preparation time set in step S13, while making the relative speed of the subject vehicle relative to the front vehicle negative.

When, in step S12 or step S14, the vehicle speed of the subject vehicle is set at a speed at which the relative speed of the subject vehicle relative to the front vehicle becomes negative, the subject vehicle moves backward relative to the front vehicle. When the subject vehicle has moved backward relative to front vehicle, the process proceeds to S15. In step S15, the controller 101 compares the present position of the subject vehicle with the blinker operation position and determines whether or not the present position of the subject vehicle has reached the blinker operation position. When the present position of the subject vehicle has not reached the blinker operation position, the controller 101 repeatedly executes the control process of Step S15.

When the present position of the subject vehicle has reached the blinker operation position, the controller 101 operates the blinker 80 to start blinking the blinker 80 in step S16.

In step S17, the controller 101 compares the present position of the subject vehicle with the moving to side start position and determines whether or not the present position of subject vehicle has reached the moving to side start position. When the present position of the subject vehicle has not reached the moving to side start position, the controller 101 repeatedly executes the control process of step S17.

When the present position of the subject vehicle has reached the moving to side start position, in step S18, the controller 101 controls the steering angle of the subject vehicle to start moving the subject vehicle to the adjacent lane side.

In step S19, the controller 101 measures the length (M) of the lane change candidate area. In step S20, the controller 101 compares the length (M) of the lane change candidate area with a predetermined determination threshold ($M_{th}$) and determines whether or not the length (M) of the lane change candidate area is equal to or greater than the determination threshold ($M_{th}$). When the length (M) of the lane change candidate area is equal to or greater than the determination threshold ($M_{th}$), in step S20, the controller 101 starts the lane change by the function of the lane change control unit 105. That is, the relative speed of the subject vehicle relative to the front vehicle becomes negative, and the blinker 80 of the subject vehicle is operated within the range in which blinking of the blinker 80 is visible to the driver of the front vehicle. As a result, the driver of the front vehicle is informed of the intention of the subject vehicle to enter the entry position and increases the vehicle speed of the front vehicle. As the vehicle speed of the front vehicle increases, the length (M) of the lane change candidate area is lengthened and there is enough room for the lane change behind the front vehicle. This allows the subject vehicle to move from the subject lane to the adjacent lane toward the entry position.

On the other hand, when the length (M) of the lane change candidate area is less than the determination threshold ($M_{th}$), the controller 101 compares the elapsed time from when starting blinking of the blinker 80 with the predetermined time, and determines whether or not the elapsed time has exceeded the predetermined time. When the elapsed time has exceeded, the controller 101 executes the control process of step S4. In other words, when a predetermined time has elapsed from when starting blinking of the blinker and the length (M) of the lane change candidate area does not become equal to or longer than the determination threshold ($M_{th}$), the controller 101 executes the lane change preparation control by the function of the lane change preparation unit 104 in order to specify a new entry position. When the elapsed time has not exceeded the predetermined time, the controller 101 executes the control of step S21. The controller 101 repeatedly executes the control loops from step S19 to step S22.

Referring to FIGS. 4A-4D, the relationship of the control process of the controller 101 and the travel scene of the subject vehicle and the other vehicle will be described. FIGS. 4A-4D show an example of the travel scene of the subject vehicle when there is no following vehicle. The travel scene changes in the order from (a) to (d). Incidentally, the vehicle shown in FIGS. 4A-4D is a vehicle in traveling, and FIGS. 4A-4D represent the position of the vehicle in a relative position. In FIG. 4A to FIG. 4D, the lane $L_1$ indicates the subject lane, the lane $L_2$ indicates the adjacent lane, the center line $C_1$ indicates the center line of the lane $L_1$ along the travel direction of the subject vehicle X, and the center line $C_2$ indicates the center line of the lane $L_2$ along the travel direction of the subject vehicle X.

Figure 4A:
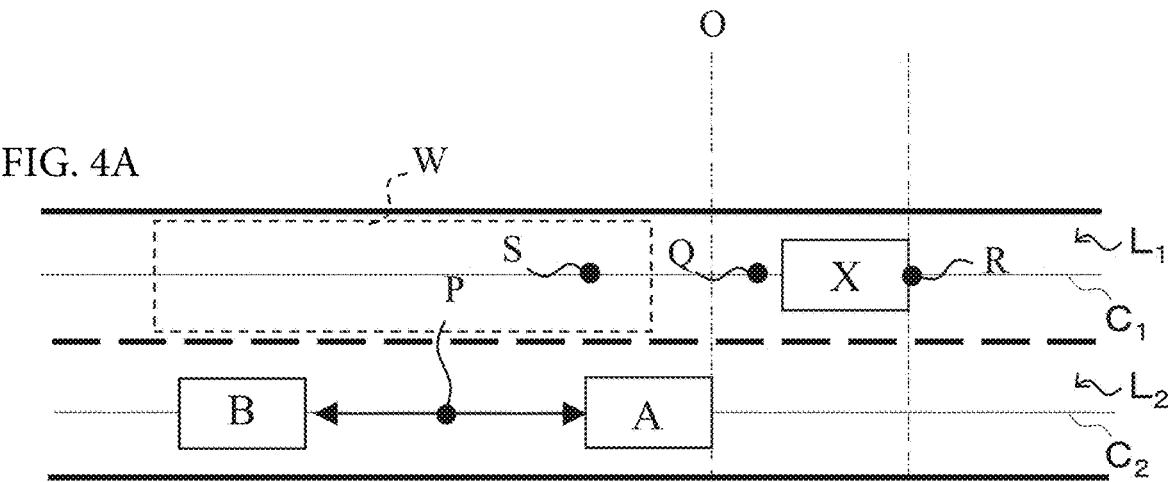
FIGS. 4A-4D are examples of the travel of the subject vehicle when the process shown in FIG. 2 is executed (when there is no following vehicle)

When the subject vehicle X passes through the lane changing point (not shown), as shown in FIG. 4A, the controller 101 acquires surrounding information of the subject vehicle X from the surrounding environment sensor group 10. The controller 101 specifies the entry position P of the subject vehicle X on the adjacent lane from the surrounding information. The controller 101 specifies the front vehicle A located in front of the entry position P, and the rear vehicle B located behind the entry position P, respectively.

The controller 101 specifies the area between the front vehicle A and the rear vehicle B as a lane change candidate area. The controller 101 sets the blinker operation position Q to a position ahead of the front vehicle A in the subject lane. The blinker operation position Q is represented by a relative position with the front end of the front vehicle A as the reference point O. The blinker operation position Q shown in FIG. 4A is merely an example, and is not particularly limited. The controller 101 also sets the vehicle speed change position R to a position ahead by a predetermined distance from the blinker operation position Q. In addition, the controller 101 sets the moving to side start position S at a position behind by a predetermined distance from the blinker operation position Q on the subject lane. The moving to side start position S is represented by a relative position with the front end of the front vehicle A as the reference point O The controller 101 controls the vehicle speed of the subject vehicle X so that the subject vehicle X is positioned relatively forward to the position of the front vehicle A. The subject vehicle X travels ahead of the front vehicle A on the subject lane, and the position of the subject vehicle X reaches the vehicle speed change position R. When the position of the subject vehicle X and the position of the front vehicle A become the positional relation as shown in FIG. 4A, the controller 101 determines whether or not there is a following vehicle which follows the subject vehicle X within the range of the predetermined area W located behind the subject vehicle X on the subject lane. As shown in FIG. 4A, the predetermined area W is set to include at least an area in which the lane change candidate area is shifted parallel to the adjacent lane.

As shown in FIG. 4A, when there is no following vehicle, the controller 101 sets the preparation time to a predetermined time, and controls the vehicle speed of the subject vehicle X so that the relative speed of the subject vehicle X relative to the front vehicle A is negative. The relative speed of the subject vehicle X relative to the front vehicle A is set according to the preparation time.

Figure 4B:
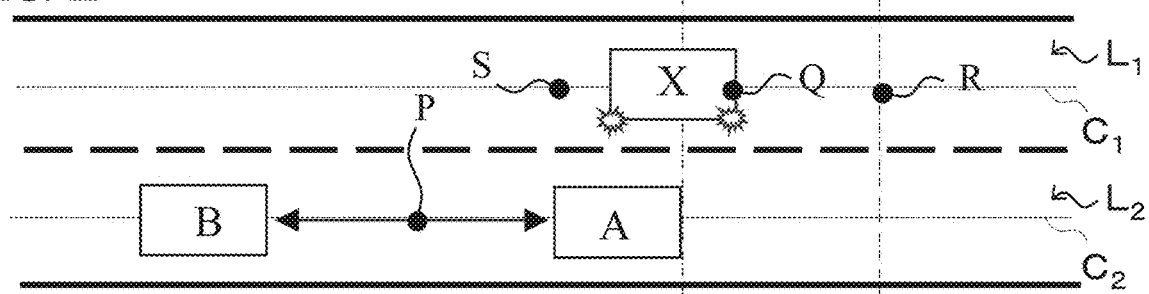

As shown in FIG. 4B, as the relative speed of the subject vehicle relative to the front vehicle A becomes negative, the subject vehicle X moves backward relative to the front vehicle A. In other words, the subject vehicle X moves closer to the front vehicle A along the travel path from the position in front of the front vehicle A. When the subject vehicle X has reached the blinker operation position Q, the controller 101 operates the blinker 80. This starts blinking of the blinker 80 from the blinker operation position Q. At this time, the driver of the front vehicle A can understand the intention of the lane change of the subject vehicle X at the position behind the front vehicle A by recognizing that the subject vehicle X is moving backward relative to the front vehicle A and that the blinker 80 of the subject vehicle X has started blinking.

Figure 4C:
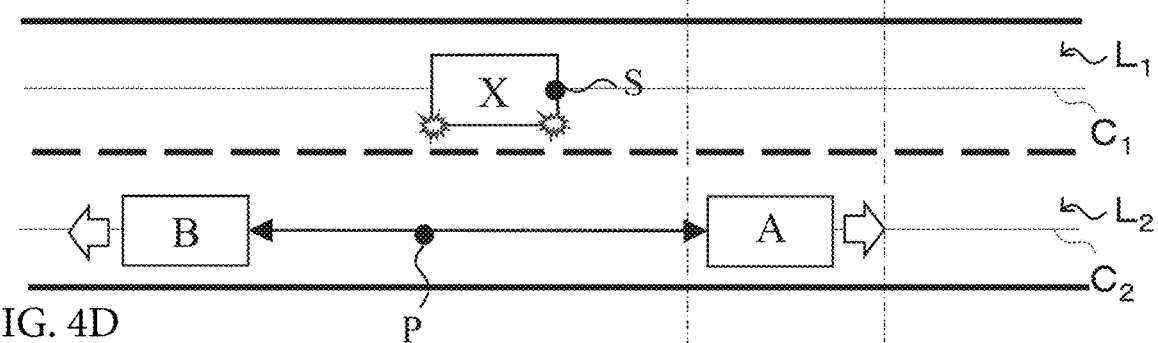

As shown in FIG. 4C, the driver of the front vehicle A understands the intention of the lane change of the subject vehicle X and increases the vehicle speed of the front vehicle. This causes the lane change candidate area to extend forward relative to the entry position P. The driver of the rear vehicle B also understands the intention of the lane change of the subject vehicle X at the position ahead of the rear vehicle B, since the subject vehicle X moves relatively backward with the blinker 80 blinking. The driver of the rear vehicle B understands the intention of the lane change of the subject vehicle X and lowers the vehicle speed of the rear vehicle. This causes the lane change candidate area to extend backward relative to the entry position P.

In addition, the subject vehicle X moves backward relative to the front vehicle A in the subject lane, and the position of the subject vehicle X reaches the moving to side start position S. When the subject vehicle X has reached the moving to side start position S, the controller 101 starts controlling the steering of the subject vehicle in order to control the subject vehicle X to move toward the adjacent lane side. Incidentally, the controller 101 controls the vehicle speed of the subject vehicle X so that the relative speed of the subject vehicle X relative to the front vehicle A is maintained negative.

Figure 4D:
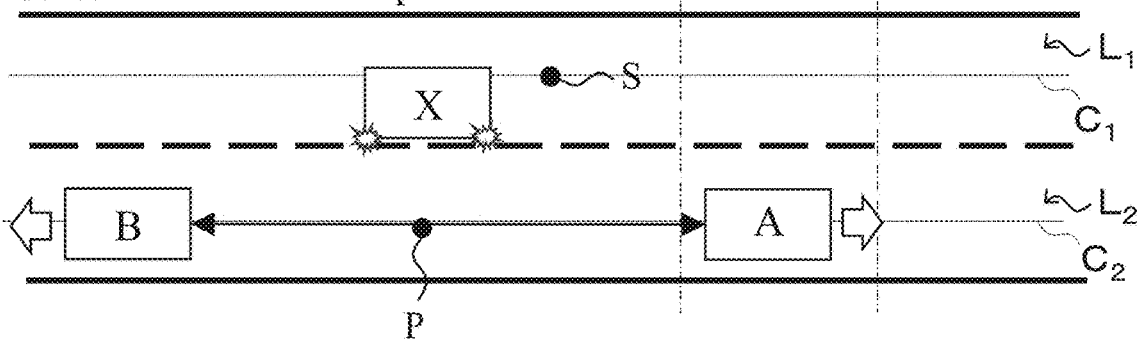

As shown in FIG. 4D, the driver of the rear vehicle B lowers the vehicle speed in order to make further space in front of the rear vehicle B, since the subject vehicle X is moving toward the adjacent lane side. As a result, the lane change candidate area is further extended backward relative to the entry position P.

The controller 101 compares the length (M) of the lane change candidate area with the determination threshold $(M_{th})$. In the example of FIG. 4D, the length (M) of the lane change candidate area corresponds to the vehicle-to-vehicle distance between the front vehicle A and the rear vehicle B. When the length (M) of the lane change candidate area is equal to or greater than the determination threshold $(M_{th})$, the controller 101 controls the subject vehicle to move toward the entry position P.

Referring now to FIGS. 5A-5D, the relationship between the control process of the controller 101 when there is a following vehicle and the travel scene of the subject vehicle and the other vehicle will be described. FIGS. 5A-5D show an example of the travel scene of the subject vehicle when there is a following vehicle. The travel scene shifts in the order of (a) to (d). Incidentally, the vehicle shown in FIGS. 5A-5D, as in FIGS. 4A-4D, is a vehicle in traveling. FIGS. 5A-5D represent the position of the vehicle in a relative position. The transition of the travel scene in FIG. 5A to FIG. 5D corresponds to the transition of the travel scene in FIG. 4A to FIG. 4D. For this reason, the explanation in FIGS. 4A-4D will be used as appropriate for parts in FIGS. 5A-5D that overlap with the explanation using FIGS. 4A-4D.

As shown in FIG. 5A, the controller 101 specifies the entry position P, the front vehicle A, the rear vehicle B, and the lane change candidate area. In addition, the controller 101 sets the blinker operation position Q, the vehicle speed change position R, and the moving to side start position S. The blinker operation position Q, the vehicle speed change position R, and the moving to side start position S are the same as those shown in FIG. 4A. The controller 101 controls the vehicle speed of the subject vehicle X so that the subject vehicle reaches the vehicle speed change position R.

When the position of the subject vehicle X and the position of the front vehicle A become the positional relation as shown in FIG. 5A, the controller 101 determines whether or not there is a following vehicle which follows the subject vehicle X within the range of the predetermined area W located behind the subject vehicle X on the subject lane.

As shown in FIG. 5A, when there is the following vehicle Y within the range of the predetermined area W, the controller 101 sets the preparation time longer than the predetermined time and controls the vehicle speed of the subject vehicle X so that the relative speed of the subject vehicle X relative to the front vehicle A becomes negative. The predetermined time is the same as the predetermined time used by the controller 101 to set the preparation time in the scene of FIG. 4A. The relative speed of the subject vehicle X relative to the front vehicle A is set according to the preparation time.

The controller 101 sets the preparation time according to the amount of the proximity between the subject vehicle X and the following vehicle Y. The preparation time is set longer when there is a following vehicle than when there is no following vehicle. Therefore, when there is a following vehicle, the difference in the vehicle speed between the vehicle speed of the front vehicle A and the vehicle speed of the subject vehicle X will be smaller than when there is no following vehicle. When comparing the relative speed set in the scene of FIG. 5A, and the relative speed set in the scene of FIG. 4A, the relative speed set in the scene of FIG. 5A has a smaller absolute value than the relative speed set in the scene of FIG. 4A.

As shown in FIG. 5B, as the relative speed of the subject vehicle X relative to the front vehicle A becomes negative, the subject vehicle X moves backward relative to the front vehicle A. Depending on the presence or absence of the following vehicle, the above relationship occurs in the relative speed. Therefore, the time required to shift from FIG. 5A to FIG. 5B is longer than the time required to shift from FIG. 4A to FIG. 4B. When the subject vehicle X has reached the blinker operation position Q, the controller 101 operates the blinker 80. The driver of the following vehicle Y can understand the intention of the lane change of the subject vehicle X at the position behind the front vehicle A by confirming that the subject vehicle X is moving relatively toward the rear of the front vehicle A and that the blinker 80 of the subject vehicle X has begun blinking.

As shown in FIG. 5C, the driver of the following vehicle Y understands the intention of the lane change of the subject vehicle X and lowers the vehicle speed of the following vehicle Y. This prevents the driver of the following vehicle Y from approaching the following vehicle Y to the subject vehicle X against the lane change of the subject vehicle X, which is executed while moving backward relative to the front vehicle. Further, unlike the case of FIG. 5C, even when the driver of the following vehicle Y does not lower the vehicle speed, the time required to shift from FIG. 5B to FIG. 5C is longer than the time required to shift from FIG. 4B to FIG. 4C. Therefore, the vehicle control device 100 is given a time for determining whether or not the following vehicle Y enters the lane change candidate area by the lane change. When the vehicle control device 100 determines that the following vehicle Y will enter the lane change candidate area, the vehicle control device 100 can prevent the subject vehicle X from approaching the following vehicle Y by increasing the vehicle speed of the subject vehicle X.

As described above, one or more embodiments of the present invention acquires, from sensors equipped in subject vehicle, surrounding information of subject vehicle and specifies, based on the surrounding information, entry position indicating a position of the entry destination of the subject vehicle, the entry position being located on an adjacent lane (a second lane) adjacent to a subject lane (a first lane) in which subject vehicle is traveling. Then, when operating a blinker of the subject vehicle, decelerating the subject vehicle, and executing a lane change, one or more embodiments of the present invention determines whether or not there is a following vehicle which follows subject vehicle in a predetermined area located behind subject vehicle in the subject lane. When determining that there is a following vehicle, one or more embodiments of the present invention sets a preparation time longer than preparation time when determining that there is not the following vehicle and controls the travel position of the subject vehicle, the preparation time indicating a time from operating the blinker of the subject vehicle to decelerating the subject vehicle and starting the lane change of the subject vehicle. In this way, one or more embodiments of the present invention gives the driver of following vehicle the time to confirm the behavior of the subject vehicle even when there is the following vehicle in the scene of decelerating the subject vehicle to perform the lane change. Also, because, when there is a following vehicle, the time required to inform other vehicles of the intention of the lane change is also longer than when there is no following vehicle, the space behind the front vehicle becomes wider, thereby making road environment where it is easier for the subject vehicle to enter the adjacent lane.

In addition, one or more embodiments of the present invention, when determining that there is the following vehicle, sets deceleration of the subject vehicle when decelerating the subject vehicle to be smaller than the deceleration when determining that there is not the following vehicle with more time to spare. This slows down the speed at which the subject vehicle decelerates, so even if the subject vehicle approaches the following vehicle, the driver of the following vehicle can respond the behavior of the subject vehicle with more time to spare. As a result, it is possible to reduce the anxiety and discomfort given to the driver of the following vehicle.

In addition, one or more embodiments of the present invention calculates an amount of proximity between the subject vehicle and the following vehicle and sets the deceleration of the subject vehicle based on the amount of the proximity. This decelerates the subject vehicle with a vehicle speed that corresponds to the positional relation between the subject vehicle and the following vehicle. For example, this can prevent the subject vehicle from decreasing at an unnecessarily slow speed when the following vehicle is traveling relatively backward to the subject vehicle. As a result, it is possible to reduce the anxiety and discomfort given to the driver of the following vehicle.

As a modification of one or more embodiments of the present invention, the controller 101 may set the vehicle speed of the subject vehicle when the subject vehicle moves from the blinker operation position to the moving to side start position, and the vehicle speed of the subject vehicle until the subject vehicle moves from the moving to side start position and starts the lane change, respectively. When it is determined that there is a following vehicle, the controller 101 sets a lower vehicle speed of the subject vehicle until the subject vehicle moves from the moving to side start position and starts the lane change than when it is determined that there is no following vehicle. In other words, when it is determined that there is a following vehicle, the controller 101 sets a lower vehicle speed of the subject vehicle when moving the subject vehicle to the adjacent lane side to the center line of the subject lane along the travel direction of the subject vehicle than when it is determined that there is no following vehicle. Thus, the time required for the subject vehicle to move from the moving to side start position to the adjacent lane side is extended, and the driver of the following vehicle can respond to the behavior of the subject vehicle with more time to spare. As a result, it is possible to reduce the anxiety and discomfort given to the driver of the following vehicle.

The controller 101 may set the vehicle speed of the subject vehicle when the subject vehicle moves from the blinker operation position to the moving to side start position to the vehicle speed of the subject vehicle when there is no following vehicle. The controller 101 may also set the vehicle speed of the subject vehicle until the subject vehicle moves from the moving to side start position and starts the lane change to the vehicle speed of the subject vehicle when there is a following vehicle. In other words, the controller 101 may take the set preparation time to prepare the lane change of the subject vehicle. In addition, the controller 101 may control the vehicle speed of the subject vehicle in any control or any scene between the time when the blinker is operated and the time when the lane change is started.

As another modification, the controller 101 may stop executing the preparation control for the lane change when a predetermined condition is satisfied.

For example, the controller 101 stops executing the preparation control for the lane change when the amount of the proximity between the subject vehicle and the following vehicle is higher than a predetermined first threshold value. The predetermined first threshold value is the threshold value that the driver of the following vehicle feels close to the subject vehicle, which is determined experimentally. For example, the predetermined first threshold value is a value corresponding to the vehicle speed of the subject vehicle, and the first threshold value is a value stored in advance in a storage device such as a ROM. When the subject vehicle and the following vehicle come close to the extent that the driver of the following vehicle feels that they are approaching, the controller 101 stops executing the preparation control for the lane change. This stops the travel of the subject vehicle that moves backward relative to the front vehicle, thereby reducing the discomfort given to the driver of the following vehicle.

In addition, for example, the controller 101 stops executing the preparation control for the lane change when the following vehicle is traveling on the adjacent lane side relative to the center line of the subject lane along the travel direction of the subject vehicle. The reason that the following vehicle is traveling on the adjacent lane side is that the following vehicle is trying to enter the entry position within the lane change candidate area by the lane change. When the following vehicle is preparing for the lane change before the subject vehicle prepares for the lane change, the controller 101 can also prevent the subject vehicle from entering the same position by the lane change and thereby the anxiety and discomfort to the driver of the following vehicle can be reduced.

Further, for example, the controller 101 stops executing the preparation control for the lane change when the amount of the proximity between the subject vehicle and the following vehicle has changed from the predetermined second threshold value or greater to less than the second threshold value while decelerating the subject vehicle. The predetermined second threshold is a distance between the subject vehicle and the following vehicle that is sufficient for the subject vehicle to perform the lane change while the subject vehicle is decelerating, and is a value that is experimentally determined. For example, the predetermined second threshold value is a value corresponding to the vehicle speed of the subject vehicle, and is a value stored in advance in a storage device such as a ROM. When the amount of the proximity between the subject vehicle and the following vehicle changes to a smaller degree while the subject vehicle is decelerating, the lane change preparation control is stopped. For example, one of the reasons that the amount of the proximity changes to smaller degree is that the driver of the following vehicle understands the intention of the lane change of the subject vehicle at the position behind the front vehicle and reduces the vehicle speed of the following vehicle. This prevents the speed at which the subject vehicle decelerates from maintaining a slow state after the driver of the following vehicle has decelerated the following vehicle. The discomfort to the driver of the following vehicle can be reduced. Incidentally, the controller 101 may continue the preparation control for the lane change after resetting the waiting time to a predetermined time without stopping the execution of the preparation control for the lane change.

Further, for example, the controller 101 may also measure the vehicle-to-vehicle distance between the front vehicle and the rear vehicle at a predetermined cycle while executing the preparation control for the lane change, and measure the change in the vehicle-to-vehicle distance with the elapsed time. The controller 101 may stop executing the preparation control for the lane change when the vehicle-to-vehicle distance between the front vehicle and the rear vehicle per unit of time changes in the direction of shortening. This can prevent the lane change to the rear of the front vehicle from being executed even though a space to be the entry destination of the subject vehicle is changing toward smaller.

In addition, for example, the controller 101 may acquire the vehicle speed of the front vehicle at a predetermined period while executing the preparation control for the lane change and monitor the size of the forward space located in front of the front vehicle. The controller 101 may stop executing the preparation control for the lane change when the vehicle speed of the front vehicle decelerates and the length of the forward space becomes equal to or greater than the determination threshold. The length of the forward space is the length along the direction in which the subject vehicle travels. This can prevent the lane change behind the front vehicle even though the subject vehicle can enter the forward space.

As another modification, the controller 101 may also control the start timing when the subject vehicle moves backward relative to the front vehicle according to the amount of the proximity between the subject vehicle and the following vehicle. Specifically, the controller 101 controls the vehicle speed of the subject vehicle up to the vehicle speed change position according to the amount of the proximity between the subject vehicle and the following vehicle. For example, the controller 101 sets the vehicle speed of the subject vehicle up to the vehicle speed change position so that the vehicle speed of the subject vehicle corresponds to the vehicle speed of the following vehicle when the amount of the proximity between the subject vehicle and the following vehicle is equal to or greater than a predetermined third threshold value. The predetermined third threshold value is the threshold value that the driver of the following vehicle feels close to the subject vehicle, which is determined experimentally. Note that the predetermined third threshold value may be the same value as or different from the predetermined first threshold value described above. Making the vehicle speed of the subject vehicle correspond to the vehicle speed of the following vehicle also includes setting the vehicle speed of the subject vehicle to the same vehicle speed as the vehicle speed of the following vehicle and setting the vehicle speed of the subject vehicle to a vehicle speed within a predetermined error range for the vehicle speed of the following vehicle. The controller 101 controls the vehicle speed of the subject vehicle so that the subject vehicle reaches the vehicle speed change position after the vehicle speed of the subject vehicle has corresponded to the vehicle speed of the following vehicle. When the subject vehicle has reached the vehicle speed change position, the controller 101 sets the vehicle speed of the subject vehicle so that the relative speed of the subject vehicle relative to the front vehicle becomes negative. This gives priority to ensuring the vehicle-to-vehicle distance between the subject vehicle and the following vehicle rather than controlling the subject vehicle to perform the lane change behind the front vehicle, thereby, it is possible to reduce the anxiety and discomfort given to the driver of the following vehicle.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described embodiment, the configuration which sets the vehicle speed change position and the blinker operation position in front of the front vehicle on the subject lane is exemplified, but the configuration is not limited to setting the vehicle speed change position and the blinker operation position in front of the front vehicle. For example, the controller 101 may set the vehicle speed change position in front of the front vehicle and the blinker operation position behind the front vehicle on the subject lane. Also, for example, the controller 101 may set the vehicle speed change position and the blinker operation position behind the front vehicle on the subject lane. The rear of the front vehicle includes, for example, an area where the lane change candidate area is shifted parallel to the subject lane. Setting the vehicle speed change position and the blinker operation position in front of the front vehicle allows the subject vehicle to inform the driver of the front vehicle of the intention of the lane change of the subject vehicle toward the rear of the front vehicle, but in the present invention, it is not necessary to inform the front vehicle of the intention of the lane change of the subject vehicle. In other words, the present invention is designed to allow the driver of the following vehicle more time to confirm the front situation in a scene where the subject vehicle moves backward relative to the front vehicle and performs the lane change, and is not affected by whether or not the driver of the front vehicle is informed of the intention of the lane change. Therefore, the present invention can also be applied to scenes where the lane changes are executed to the rear of the front vehicle without informing the driver of the front vehicle of the intention of the lane change.

In addition, for example, in the above-described embodiment, the configuration which sets the moving to side start position and executes the moving to side control before executing the lane change control has been described as an example, but the moving to side control does not necessarily have to be executed.

In addition, for example, in the above-described embodiment, a scene in which the lane change is executed while the subject vehicle moves backward relative to the front vehicle has been described as an example, but the presence of the front vehicle is not necessarily required in the scene of the lane change of the subject vehicle. As the control of the travel position of the subject vehicle on the subject lane during the preparation time, the lane change preparation unit 104 may control the vehicle speed of the subject vehicle, for example, so that the subject vehicle does not approach the following vehicle until the lane change is started. For example, the lane change preparation unit 104 controls the vehicle speed of the subject vehicle so that the vehicle-to-vehicle distance between the subject vehicle and the following vehicle is maintained. The lane change preparation unit 104 may also control the vehicle speed of the subject vehicle so that the relative speed relative to the following vehicle is within a predetermined range. For example, the lane change preparation unit 104 may control the vehicle speed of the subject vehicle so that the deceleration is relatively smaller than when decelerating the subject vehicle during the lane change.

For example, in the present description, the vehicle control device according to the present invention is described by taking the vehicle control device 100 as an example, but the present invention is not limited thereto. In addition, in the present description, the first lane according to the present invention is described using the subject lane as an example, but the present invention is not limited thereto. In addition, in the present description, the second lane according to the present invention is described using the adjacent lane, but the present invention is not limited thereto.

EXPLANATIONS OF LETTERS OR NUMERALS

10 . . . Surrounding environment sensor group
11 . . . Radar
12 . . . Imaging device
20 . . . Vehicle sensor group
30 . . . Navigation system
40 . . . Map database
50 . . . HMI
60 . . . Actuator controller
70 . . . Vehicle control actuator group
80 . . . Blinker
100 . . . Vehicle control device
101 . . . Controller
102 . . . Information acquiring unit
103 . . . Lane changing point specifying unit
104 . . . Lane change preparation unit
105 . . . Lane change control unit
200 . . . Vehicle system

The invention claimed is:

1. A vehicle control method executed by a processor capable of executing a lane change of a subject vehicle, comprising:
   acquiring, from sensors equipped in the subject vehicle, surrounding information of the subject vehicle;
   specifying, based on the surrounding information, an entry position indicating a position of an entry destination of the subject vehicle, the entry position being located on a second lane adjacent to a first lane in which the subject vehicle is traveling;
   when operating a blinker of the subject vehicle, decelerating the subject vehicle, and executing a lane change, determining whether or not there is a following vehicle which follows the subject vehicle in a predetermined area located behind the subject vehicle on a first lane,
   when determining that there is the following vehicle, setting a following vehicle preparation time that is longer than a no-following vehicle preparation time when determining that there is not the following vehicle, the following vehicle and the no-following vehicle preparation times indicating a time from operating the blinker of the subject vehicle to decelerating the subject vehicle and starting the lane change of the subject vehicle; and
   executing a control to decelerate of the subject vehicle on the first lane within the following vehicle preparation time.

2. The vehicle control method according to claim 1, comprising:
   when determining that there is the following vehicle, setting a following vehicle deceleration of the subject vehicle when decelerating the subject vehicle to be smaller than a no-following vehicle deceleration when determining that there is not the following vehicle.

3. The vehicle control method according to claim 2, comprising:
calculating an amount of proximity between the subject vehicle and the following vehicle; and
setting the following vehicle deceleration of the subject vehicle based on the amount of the proximity.

4. The vehicle control method according to claim 1, comprising:
calculating an amount of proximity between the subject vehicle and the following vehicle; and
when the amount of the proximity is equal to or greater than a first threshold value, stopping an execution of the control to decelerate the subject vehicle on the first lane.

5. The vehicle control method according to claim 1, comprising:
when the following vehicle is traveling in a second lane side relative to a center line of the first lane along a direction of travel of the subject vehicle, stopping an execution of the control to decelerate the subject vehicle on the first lane.

6. The vehicle control method according to claim 1, comprising:
calculating an amount of proximity between the subject vehicle and the following vehicle; and
when, while the subject vehicle is decelerating, the amount of the proximity has changed from a value which is equal to or greater than a second threshold value to a value which is lower than the second threshold value, setting the following vehicle preparation time to a time when there is not the following vehicle.

7. The vehicle control method according to claim 1, comprising:
calculating an amount of proximity between the subject vehicle and the following vehicle;
when the amount of the proximity is equal to or greater than a third threshold value, setting a vehicle speed of the subject vehicle so that the vehicle speed of the subject vehicle corresponds to the vehicle speed of the following vehicle; and
after the vehicle speed of the subject vehicle has corresponded to the vehicle speed of the following vehicle, starting the control to decelerate the subject vehicle.

8. The vehicle control method according to claim 1, further comprising:
executing a speed control or a steering control of the subject vehicle on the first lane according to the following vehicle preparation time.

9. A vehicle control method executed by a processor capable of executing a lane change of a subject vehicle, comprising:

acquiring, from sensors equipped in the subject vehicle, surrounding information of the subject vehicle;
specifying, based on the surrounding information, an entry position indicating a position of an entry destination of the subject vehicle, the entry position being located on a second lane adjacent to a first lane in which the subject vehicle is traveling;
when operating a blinker of the subject vehicle, decelerating the subject vehicle, and executing a lane change, determining whether or not there is a following vehicle which follows the subject vehicle in a predetermined area located behind the subject vehicle on a first lane,
when determining that there is the following vehicle, setting a preparation time longer than the preparation time when determining that there is not the following vehicle, the preparation time indicating a time from operating the blinker of the subject vehicle to decelerating the subject vehicle and starting the lane change of the subject vehicle;
when determining that there is the following vehicle, setting a vehicle speed of the subject vehicle when moving the subject vehicle to a second lane side relative to the center line of the first lane along the direction of travel of the subject vehicle to be lower than the vehicle speed when determining that there is not the following vehicle; and
controlling a travel position of the subject vehicle on the first lane within the preparation time.

10. A vehicle control device comprising a control device capable of executing a lane change of a subject vehicle, wherein the control device is configured to:
acquire, from sensors equipped in the subject vehicle, surrounding information of the subject vehicle;
specify, based on the surrounding information, an entry position indicating a position of an entry destination of the subject vehicle, the entry position being located on a second lane adjacent to a first lane in which the subject vehicle is traveling;
when operating a blinker of the subject vehicle, decelerating the subject vehicle, and executing a lane change, determine whether or not there is a following vehicle which follows the subject vehicle in a predetermined area located behind the subject vehicle on a first lane;
when determining that there is the following vehicle, set a following vehicle preparation time that is longer than a no-following vehicle preparation time when determining that there is not the following vehicle, the following and no-following vehicle preparation times indicating a time from operating the blinker of the subject vehicle to decelerating the subject vehicle and starting the lane change of the subject vehicle; and
execute a control to decelerate the subject vehicle in the first lane within the following vehicle preparation time.

* * * * *